Oct. 20, 1953 H. G. DIBELKA 2,656,426
SWITCH FOR USE IN TURN-INDICATING SIGNALING SYSTEMS
Filed May 10, 1950 3 Sheets-Sheet 1
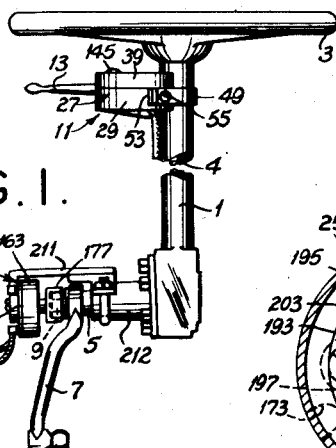
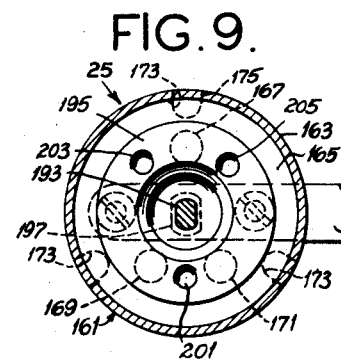
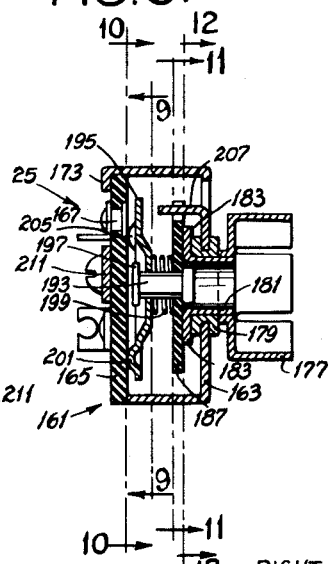
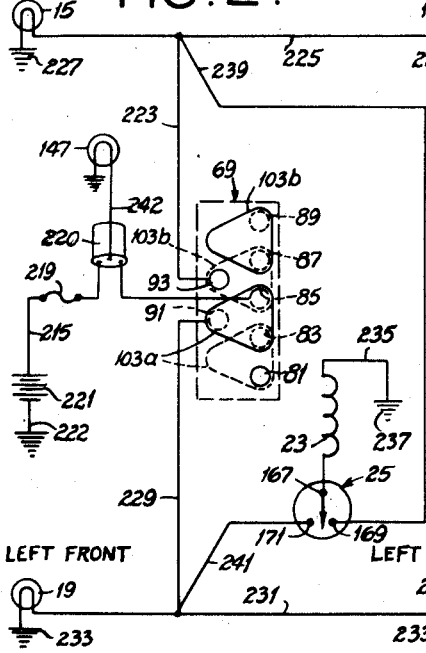
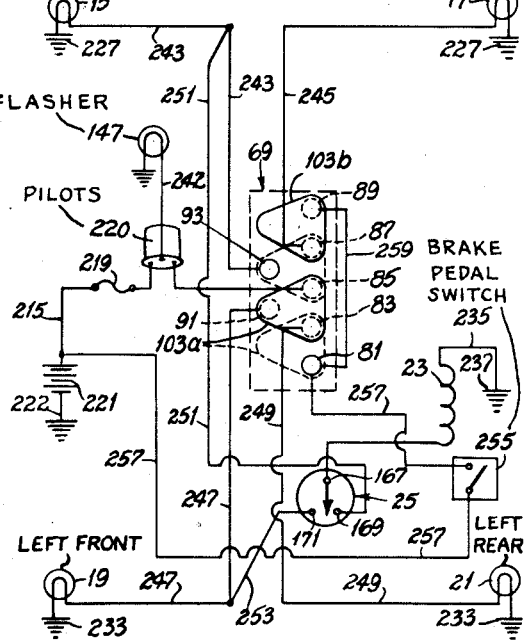
Henry G. Dibelka,
Inventor,
Haynes and Koenig,
Attorneys.

Oct. 20, 1953 H. G. DIBELKA 2,656,426
SWITCH FOR USE IN TURN-INDICATING SIGNALING SYSTEMS
Filed May 10, 1950 3 Sheets-Sheet 2
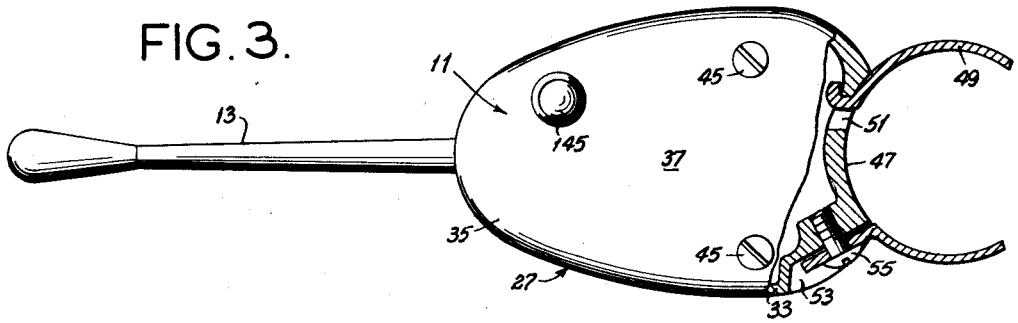
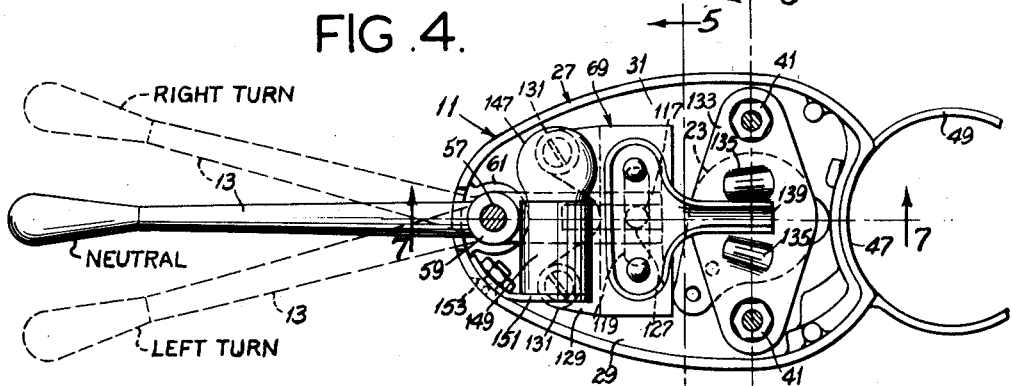
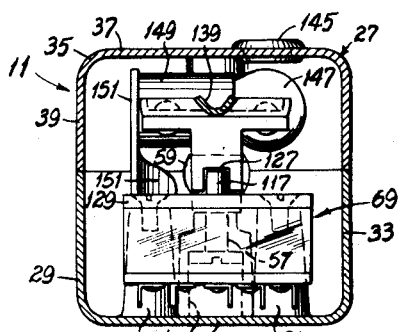
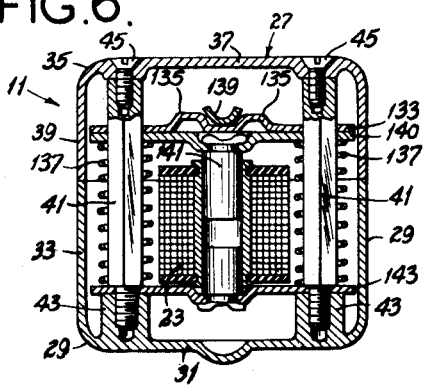
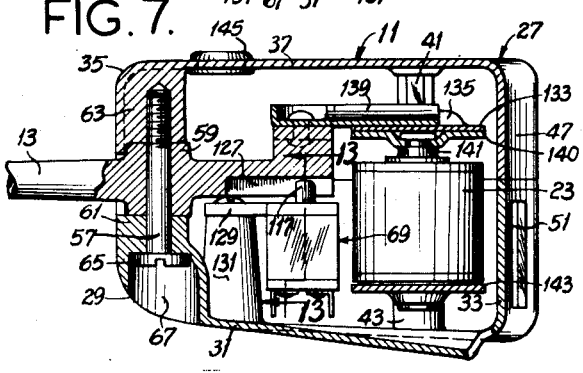
Henry G. Dibelka,
Inventor,
Haynes and Koenig,
Attorneys.

Oct. 20, 1953  H. G. DIBELKA  2,656,426
SWITCH FOR USE IN TURN-INDICATING SIGNALING SYSTEMS
Filed May 10, 1950  3 Sheets-Sheet 3

Henry G. Dibelka,
Inventor,
Haynes and Koenig,
Attorneys.

Patented Oct. 20, 1953

2,656,426

UNITED STATES PATENT OFFICE 2,656,426

SWITCH FOR USE IN TURN-INDICATING SIGNALING SYSTEMS

Henry G. Dibelka, Chicago, Ill., assignor to Auto Lamp Manufacturing Co., Chicago, Ill., a limited partnership Application May 10, 1950, Serial No. 161,199

1 Claim. (Cl. 200—61.27)

This invention relates to switches for use in turn-indicating signalling systems for vehicles, and more particularly to switches for use in "automatically resetting" or "self-cancelling" systems of this class.

The object of the invention is the provision of a novel improved switch for use in an "automatically resetting" or "self-cancelling" turn-indicating signalling system for vehicles, which may be economically manufactured and readily installed, without requiring any alteration of vehicle structure, and which is reliable and relatively trouble-free in operation. By "automatically resetting" or "self-cancelling" is meant herein a type of system wherein a switch-operating member is manually moved from a neutral position to a right turn position or to a left turn position to cause operation of a right turn indicator or a left turn indicator, respectively, and wherein the operating member automatically returns to its neutral position in response to turning of the vehicle.

The invention accordingly comprises the elements and combinations of elements, features of construction, and arrangements of parts which will be exemplified in the structures hereinafter described, and the scope of the application of which will be indicated in the following claim.

In the accompanying drawings,

Fig. 1 is a diagrammatic view in elevation of part of the steering gear of a vehicle having elements of the signalling system applied thereto;

Fig. 2 is a wiring diagram of one system;

Fig. 3 is a plan view of a switch of the invention, with parts broken away and shown in section;

Fig. 4 is a view similar to Fig. 3 but with a cover of the switch removed;

Figures 13, 14:
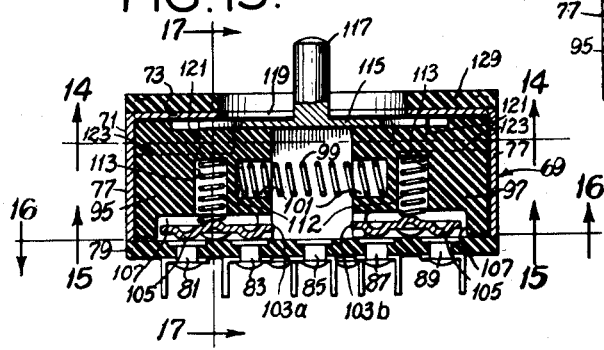
Figure 15:
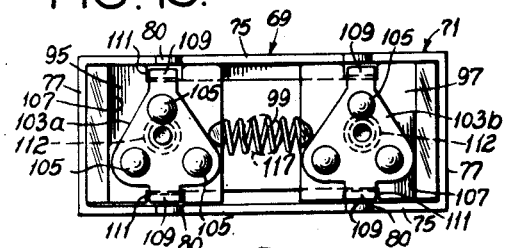

Figs. 5, 6 and 7 are sections taken respectively on lines 5—5, 6—6 and 7—7 of Fig. 4, with the cover in place;

Fig. 8 is a longitudinal section of a steering-gear-controlled switch used in the system;

Figs. 9, 10, 11 and 12 are sections taken respectively on lines 9—9, 10—10, 11—11 and 12—12 of Fig. 8;

Fig. 13 is an enlarged section of a switch unit in the switch, taken substantially on line 13—13 of Fig. 7;

Figs. 14, 15, 16 and 17 are sections taken respectively on lines 14—14, 15—15, 16—16 and 17—17 of Fig. 13; and, Fig. 18 is a wiring diagram of an alternative form of the system.

Similar reference characters indicate corresponding parts throughout the several views of the drawings.

Referring to the drawings, there is shown at 1 in Fig. 1 the conventional steering column of a motor vehicle. The steering wheel of the vehicle is designated 3. As is conventional and well known and therefore not shown in detail, the steering wheel is fixed on the upper end of a steering rod 4 which extends through the steering column. The steering rod 4 is geared at its lower end to a shaft 5 carrying the usual pitman arm 7 for actuating the usual drag link (not shown). Usually the pitman arm is held on the shaft 5 by a nut 9 threaded on the end of the shaft, the nut being hexagonal. Mounted on the steering column just under the steering wheel is a manual control switch of this invention, generally designated 11. This has an operating member 13 consisting of a pivoted lever which is biased to a neutral position and which may be manually swung to one side of its neutral position to a right turn position or to the other side of its neutral position to a left turn position. When the lever is moved to right turn position, it closes a circuit including front and rear electrical right turn indicators, specifically signal lamps 15 and 17, mounted on the right of the vehicle at the front and rear thereof (Fig. 2). When the lever is moved to left turn position, it closes a circuit including front and rear electrical left turn indicators, specifically signal lamps 19 and 21, mounted on the left of the vehicle at the front and rear. The lever 13 is adapted to be latched in either its right turn or its left turn position by an electrically controlled latch, to be more particularly described, including electromagnetic means and specifically a solenoid coil 23 (Fig. 2). The latter is connected in a circuit including a switch 25 actuated by the shaft 5. The switch 25 is open when the vehicle is not in a turn. However, when the steering wheel is turned to make either a right or left turn, the switch 25 closes and completes the solenoid coil circuit to energize the coil and release the lever 13 for its return to neutral position.

As illustrated in detail in Figs. 3–7, the manual control switch 11 comprises a support made as a two-part housing 27. The housing comprises a cup-shaped base 29 having a bottom wall 31 and a peripheral wall 33, and a cup-shaped cover 35 having a top wall 37 and a peripheral wall 39, the base and cover being engaged rim-to-rim and held together by posts 41. The latter are threaded at their lower ends in bosses 43 projecting upward from the bottom wall 31 of the base. Screws 45 extend through the top wall 37 of the cover and are threaded in the upper ends of the posts. The peripheral walls of both the base an the cover are made concave at one end of the housing, as indicated at 47, to fit the steering column 3. The housing is adapted to be secured to the steering column under the steering wheel 3 by a strap 49 hooked at one end in an opening 51 in the concaved end of the base 29 with its other end secured in a recess 53 in the peripheral wall 33 of the base by means of a screw 55.

The posts 41 are located near the concaved end of the housing. The lever 13 is pivoted intermediate its ends on a headed stud 57 located at the center of the other end of the housing, the stud being fixed in position parallel to the posts. As shown in Fig. 7, the stud extends through a hub 59 of the lever, the hub being located between a boss 61 formed integrally with the base 29 and a boss 63 formed integrally with the cover 35. The head 65 of the stud is received in a recess 67 opening toward the bottom of the base and the stud is threaded at its upper end in the boss 63. Thus, the stud acts to hold the base and cover in assembled relation as well as the posts 41.

Figure 16:
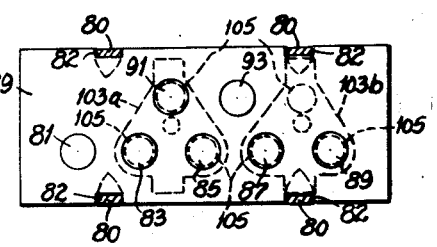
Figure 17:
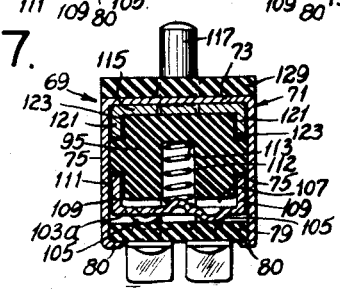

Within the housing is mounted a switch unit generally designated 69. The construction of this unit is detailed in Figs. 13–17 and comprises a sheet metal case 71 which in plan is of elongate rectangular outline and in end elevation (Fig. 7) is of approximately square outline. The case has a top wall 73, side walls 75 and end walls 77. Its open bottom is closed by a bottom closure member 79 of insulating material, held in assembled relation with the metal case by tongues 80 formed as integral parts of the side walls of the case extending through notches 82 in the side edges of the closure 79 and bent under the latter (see Fig. 16). Riveted in the closure member 79 are seven contacts 81, 83, 85, 87, 89, 91 and 93, arranged as illustrated in Fig. 16.

Longitudinally slidable in the case are two blocks 95 and 97 of insulating material. These are biased away from one another toward neutral position wherein their outer ends engage the opposite end walls of the case by a compression spring 99. The two blocks are identical, their positions being reversed in assembly. Each block has a recess 101 in its inner end receiving the respective end of the spring 99. Associated with each block is a generally triangular contact plate, the plate associated with block 95 being designated 103a and the plate associated with block 97 being designated 103b, each plate having three contact bosses 105 arranged in a triangle. Each plate is accommodated in a recess 107 in the bottom of its respective block and has upwardly projecting tongues 109 slidable in vertical grooves 111 in the sides of its respective block. Each plate is biased downward against the closure member 79 by a compression spring 112 located in a recess 113 in the respective block. The faces of contacts 81—93 are flush with the inside face of member 79.

A metal plate or slide 115 is slidable longitudinally of the case 69 between the top surfaces of the blocks 95 and 97 and the top 73 of the case. This plate carries a stud 117 which exends upward through an elongate longitudinal slot 119 in the top of the case. At its ends, the plate or slide 115 has downturned ears 121 which are received in horizontal grooves 123 in the sides of the blocks behind shoulders 125 on the block. When the two blocks are in their normal position at the ends of the case (Figs. 13–15), the shoulders 125 on both blocks engage the ears 121 at the ends of the slide 115. In this position of the blocks, the stud 117 is centered in a neutral position (Figs. 5 and 13). The contact plate 103a associated with the block 95 bridges contacts 81 and 83 when the block is in its normal end position. When the block 95 is moved to the right, as viewed in Figs. 13–16, the contact plate 103a associated therewith bridges contacts 83, 85 and 91, as indicated in Fig. 16. The contact plate 103b associated with the block 97 bridges contacts 87 and 89 when the block is in its normal end position. When the block 97 is moved to the left, as viewed in Figs. 13–16, the contact plate 103b associated therewith bridges contacts 85, 87 and 93.

The inner end of the lever 13 inside the housing 27 is formed with a longitudinal groove 127 in its bottom. The switch unit 69 is mounted under the inner end portion of the lever with the stud 117 extending into the groove 127. The unit 69 is carried by a bracket 129 mounted on posts 131 extending upward from the bottom wall 31 of the housing base 29. The bracket has a slot coextensive with the slot 119. The arrangement is such that when the two blocks 95 and 97 are in their end positions, and stud 117 is centered (Figs. 4, 5 and 13–15), the lever 13 occupies the neutral position shown in Fig. 3 and in solid lines in Fig. 4. When the lever is swung clockwise from its neutral position as viewed in Fig. 4 to the upper dotted-line position shown, which is its right turn position, it moves the stud 117 to the left as shown in Figs. 5 and 13, thereby moving the block 97 to the left so that the contact plate 103b associated with the block 97 bridges contacts 85, 87 and 93. This compresses the spring 99. When the lever is swung counterclockwise from neutral as viewed in Fig. 4 to the lower dotted-line position shown which is its left turn position, it moves the stud 117 to the right as viewed in Figs. 5 and 13, thereby moving the block 95 to the right so that the contact plate 103a associated with the block 95 bridges contacts 83, 85 and 91 (see Fig. 16). Here again, the spring 99 is compressed.

The lever 13 is adapted to be latched in either of its right or left turn positions by a latch plate 133 mounted for sliding movement on the posts 41. The latch plate is formed with two upwardly projecting bosses 135 on opposite sides of its center and is biased upward by compression springs 137 which fit around the posts 41. The lever 13 has a nose or detent 139 fixed upon its inner end extending over the latch plate. When the lever is in neutral position, the detent 139 is received in the groove between the bosses 135 (see Figs. 4 and 6). When the lever is swung either to right turn or left turn position, the detent rides over a boss, thereby camming down the latch plate against the bias of the springs 137, until the detent rides off the boss, whereupon the latch plate springs upward to latch the lever in either right turn or left turn position with the detent engaged against the side of the appropriate boss. Springs 137 exert sufficient force to hold the lever latched either in right turn or left turn position against the return bias of the spring 99. The latch plate 133 is fixed to a plate 140 riveted on the upper end of a magnetic plunger 141 which is vertically slidable in solenoid coil 23. The latter is mounted on a base plate 143 supported at its ends on the bosses 43 and held by the posts 41. The arrangement is such that when the coil is energized, the latch plate is pulled downward against the bias of the springs 137 to release the lever 13 for return to neutral position, should the lever have been latched either in right turn or left turn position.

In the top wall 37 of the cover 35 of the housing 27 is a window 145. A pilot lamp 147 is mounted in the housing under the window, the lamp being received in a socket 149 mounted on a bracket 151 secured to the side wall of the housing as indicated at 153.

The switch 25 is illustrated in detail in Figs. 8–12. As shown, it comprises a two-part housing 161 consisting of a cup-shaped case 163 and a closure 165 of insulating material for the case. Riveted in the closure 165 are three contacts 167, 169 and 171, their inside faces being flush with the inside surface of the closure. The closure is held in assembled relation with the case by tongues 173 formed as integral parts of the case extending through notches 175 in the periphery of the closure and bent over upon the outside of the closure (see Fig. 9). A socket 177, formed of sheet metal, is mounted for rotation in a bearing 179 at the center of the base of the case 163. The socket is of hexagonal form to fit the nut 9 usually found on the end of the pitman arm shaft 5 of the steering gear, and has a hollow shank 181 extending through the bearing 179 into the case. At its end within the case, the shank is formed with out-turned diametrically opposite flange portions 183.

At 187 is shown a disc of insulating material. This disc is held in centered position against the flanges 183 at the inner end of the shank 181 by tongues 189 extending from the lower end of the shank into openings 191 in the disc. The tongues 189 are located between the flanges 183, and key the disc to the shank and the socket 177 for rotation therewith. A stud 193 is fixed in the center of the disc and extends toward the closure 165. The stud is non-circular and extends through a corresponding opening in a contact plate 195, the latter being rotatable with and axially slidable on the stud. A head 197 on the end of the stud keeps the contact plate on the stud. A compression spring 199 surrounds the stud between the disc and the contact plate to bias the latter into engagement with the closure 165. The contact plate has three contact bosses 201, 203 and 205. As illustrated, a tongue 207 struck from the material of the case extends into a notch 209 in the periphery of the disc 187 for locating purposes in assembly.

Figure 10:
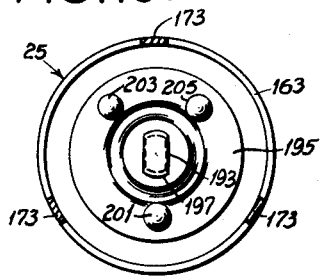
Figure 11:
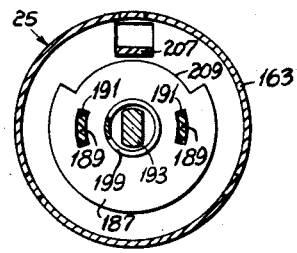
Figure 12:
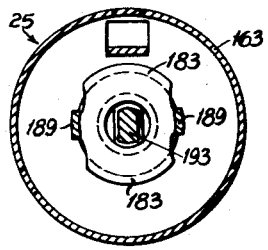

As illustrated in Fig. 1, the switch 25 is carried by a bracket 211 attached to the housing 212 for the shaft 5 with the nut 9 on the end of the shaft 5 received in the socket 177. Thus, as the steering wheel 3 is turned to right or left, the socket 177, disc 187, the stud 193 and the contact plate 195 also turn. Fig. 11 illustrates a neutral position of the disc 187 corresponding to the neutral position of the steering wheel. In this position of the disc, the tongue 207 is at the center of the notch 209. The position of the bosses 201, 203 and 205 on the contact plate 195 for this neutral position of the disc 187 is shown in Fig. 9. When the steering wheel is turned to the right, the contact plate 195 is turned to a right turn position wherein boss 203 on the plate engages contact 167 and boss 201 engages contact 169, thus completing a circuit from contact 167 to contact 169 through the contact plate. When the steering wheel is turned to the left, the contact plate 195 is turned to a left turn position wherein boss 205 on the plate engages contact 167 and boss 201 engages contact 171, thus completing a circuit from contact 167 to contact 171.

Fig. 2 illustrates a wiring arrangement wherein the front and rear signal lamps are solely turn-indicating signal lamps, another conventional lamp or lamps (not shown) being used for stop indicating purposes. As shown, a power line 215 including a fuse 219 and a flasher 220 leads from one terminal of the battery 221 of the vehicle to the center contact 85 of the switch unit 69. The other terminal of the battery is grounded as indicated at 222. A branch line 223 leads from the contact 93 of switch unit 69 to a line 225 connecting the right front and rear signal lamps 15 and 17. The latter are grounded as indicated at 227. A branch line 229 leads from the contact 91 of the switch unit 69 to a line 231 connecting the left front and rear signal lamps 19 and 21. The latter are grounded as indicated at 233. The solenoid coil 23 is connected in a line 235 connected at one end to the contact 167 of the switch 25 and grounded at its other end as indicated at 237. A line 239 connects line 223 and contact 169 of switch 25, and a line 241 connects line 229 and contact 171 of switch 25. The flasher 220 may be of any suitable conventional type, for example one such as shown in U. S. Patent 1,979,349. The pilot lamp 147 is connected in a circuit 242 leading from a terminal of the flasher to one terminal of the pilot lamp socket, the other terminal of the socket being connected to ground.

In the operation of the system wired as illustrated in Fig. 2, when the driver of the vehicle is about to make a right turn, he swings the lever 13 to its right turn position, thereby moving the contact plate 103b associated with the block 97 into position bridging contacts 85 and 93 of switch unit 69, this position of plate 103b being illustrated in dotted lines in Fig. 2. Plate 103a remains in its end position, as illustrated in dotted lines in Fig. 2. This compresses the spring 99. The lever is held latched in right turn position by the latch plate 133. With contacts 85 and 93 bridged by the contact plate 103b, a circuit is established from the battery through fuse 219, flasher 220, from contact 85 to contact 93 through contact plate 103b, and through lines 223 and 225 to the front and rear right signal lamps 15 and 17, the circuit being completed through ground back to the battery.

The lamps 15 and 17 flash on and off as long as the lever is latched in right turn position. The pilot lamp 147 flashes on and off to apprise the driver of the operation of the system. When the steering wheel 3 is turned to make the right turn, this turns the steering rod 4 and the pitman arm shaft 5, and the shaft 5 turns the contact plate 195 of switch 25 to a position wherein the plate 195 bridges contacts 167 and 169. This completes a circuit through the solenoid coil 23, this circuit being established from contact 93 through line 223, line 239, from contact 169 through the plate 195 to contact 167, and through line 235 including coil 23 to ground at 237. Coil 23 is thus energized, and retracts the latch plate 133 against the bias of springs 137 to release the lever 13, whereupon the lever returns to neutral position, and the block 97 returns to its end position under the bias of spring 99. As the block 97 returns to its end position, contact plate 103b slides off contacts 85 and 93 and opens the signal lamp circuit, whereupon the right front and rear lamps and the pilot lamp are deenergized.

When the driver of the vehicle is about to make a left turn, he swings the lever 13 to its left turn position, thereby moving the contact plate 103a associated with the block 95 into position bridging contacts 85 and 91 of switch unit 69, this position of plate 103a being illustrated in solid lines in Fig. 2 and in dotted lines in Fig. 16. Plate 103b remains in its end position, illustrated in solid lines in Fig. 2. This compresses the spring 99. The lever is held latched in left turn position by the latch plate 133. With contacts 85 and 91 bridged by the contact plate 103a, a circuit is established from the battery through fuse 219, flasher 220, from contact 85 to contact 91 through contact plate 103a, and through lines 229 and 231 to the front and rear left signal lamps 19 and 21, the circuit being completed through ground back to the battery.

The lamps 19 and 21 and the pilot lamp 147 flash on and off as long as the lever is latched in left turn position. When the steering wheel is turned to make the left turn, this turns the steering rod 4 and the pitman arm shaft 5, and the shaft 5 turns the contact plate 195 of switch 25 to a position wherein the plate 195 bridges contacts 167 and 171. This completes a circuit through the solenoid coil 23, this circuit being established from contact 91 through line 229, line 241, from contact 171 through the plate 195 to contact 167, and through line 235 including coil 23 to ground at 237. Coil 23 is thus energized, and retracts the latch plate 133 against the bias of springs 137 to release the lever 13, whereupon the lever returns to neutral position, and the block 95 returns to its end position under the bias of spring 99. As the block returns to its end position, contact plate 103a slides off the contacts 85 and 91 and opens the signal lamp circuit, whereupon the left front and rear lamps and the pilot lamp are deenergized.

It will be seen that coil 23 is automatically energized to release the lever 13 for return to its neutral position as soon as the driver turns the wheel to go into a turn. If, however, the driver should wish to cancel a direction signal without turning, he may simply manually push the lever 13 back to its neutral position.

It will be noted that with the Fig. 2 system, only three contacts of switch unit 69 are utilized. Fig. 18 illustrates a system wherein the front and rear lamps are used for turn-indicating signals and the rear lamps are also used for stop signals, all seven contacts of switch unit 69 here being utilized. As shown, power line 215 including a fuse 219 and the flasher 220 leads from one terminal of the battery 221 to the center contact 85 of the switch unit 69, the other terminal of the battery being grounded as indicated at 222, as in Fig. 2. A branch line 243 leads from contact 93 to the right front lamp 15. A branch line 245 leads from contact 87 to the right rear lamp 17. A branch line 247 leads from contact 91 to the left front lamp 19. A branch line 249 leads from contact 83 to the left rear lamp 21. The solenoid coil 23 is connected in a line 235 connected at one end to the contact 167 of switch 25 and grounded at its other end as indicated at 237, as in Fig. 2. A line 251 connects line 243 and contact 169 of switch 25, and a line 253 connects line 247 and contact 171 of switch 25. A switch 255 operated by the brake of the vehicle (closed when the brake pedal of the vehicle is depressed) is connected in a line 257 leading from the battery to the contact 81 of switch unit 69. A line 259 connects contacts 81 and 89.

In the operation of the system wired as in Fig. 18, assuming the lever 13 is in its neutral position, and contact plates 103a and 103b are in their end positions, when the driver applies the brakes of the vehicle and thereby closes switch 255, both rear lamps 17 and 21 are steadily energized for signalling a stop. Under these circumstances, the rear lamps have a common circuit from the battery through line 257 (switch 255 being closed) to contact 81, and branch circuits from contact 81 through contact plate 103a, contact 83, line 249, the lamp 21 and through ground back to the battery, and from contact 81 through line 259, contact 89, contact plate 103b, contact 87, line 245, the lamp 17 and through ground back to the battery.

To signal a right turn, the driver swings lever 13 to right turn position, thereby moving contact plate 103b into position bridging contacts 85, 87 and 93, the lever becoming latched in right turn position. This causes the right front and rear lamps 15 and 17 and the pilot lamp 147 to flash, lamps 15 and 17 having a common circuit from the battery through fuse 219 and the flasher 220 to contact 85, with branch circuits from contact 85 through contact plate 103b, contact 93 and through line 243 to the right front lamp 15, and from contact 85 through contact plate 103b, contact 87 and line 245 to the right rear lamp 17. Now, if the driver should apply the brakes and close switch 255, the left rear lamp 21 will be steadily energized for signalling a stop, the circuit for this lamp being completed as follows: from the battery through line 257 (switch 255 being closed) to contact 81, through contact plate 103a (which is in its end position) to contact 83 and thence through line 249 to the left rear lamp 21, and through ground back to the battery. It will be noted that with the contact plate 103b in the dotted line position shown in Fig. 18, the circuit is broken between lines 259 and 245, consequently closure of switch 255 has no effect on the right rear light 17, which is flashing to signal a right turn. When the steering wheel is turned, going into the signalled right turn, the circuit for solenoid coil 23 is established from line 243 through line 251 to contact 169 of switch 25, and through contact plate 195 of switch 25 to contact 167 and thence through line 235 including coil 23 to ground, as in the Fig. 2 system, to return the lever 13 to neutral position.

To signal a left turn, the driver swings lever 13 to left turn position, thereby moving contact plate 103a into position bridging contacts 83, 85 and 91, the lever becoming latched in left turn position. This causes the left front and rear lamps 19 and 21 and the pilot lamp 147 to flash, lamps 19 and 21 having a common circuit from the battery through fuse 219 and the flasher 220 to contact 85, with branch circuits from contact 85 through contact plate 103a, contact 91 and through line 247 to the left front lamp 19, and from contact 85 through contact plate 103a, contact 83, and through line 249 to the left rear lamp 21. Now, if the driver should apply the brakes and close switch 255, the right rear lamp 17 will be steadily energized for signalling a stop, the circuit for this lamp being completed as follows: from the battery through line 257 (switch 255 being closed) to contact 81, thence through line 259 to contact 89, and through contact plate 103b (which is in its end position) to contact 87 and through line 245 to right rear lamp 17. It will be noted that with contact plate 103a in the solid line position shown in Fig. 18, the circuit is broken between lines 257 and 249, consequently closure of switch 255 has no effect on the left rear light 21, which is flashing to signal a left turn. When the steering wheel is turned, going into the signalled left turn, the circuit for coil 23 is established from line 247 through line 253 to contact 171 of switch 25 and through contact plate 195 of switch 25 to contact 167 and thence through line 235, to return the lever 13 to neutral position.

It will be noted that, with either the Fig. 2 or Fig. 18 system, the lever 13 is manually set for signalling a right or left turn, as required, and is latched in either right or left turn position. This causes the lamps on the appropriate side of the vehicle to flash. When the steering wheel of the vehicle is turned going into the signalled turn, the lever automatically returns to neutral position and the turn signal is discontinued. The return of the lever to neutral position is not dependent upon return of the steering gear to a straight course after completion of the turn. The lever may also be manually returned to neutral position as desired. The Fig. 18 system in effect combines the Fig. 2 system with a stop signal system to provide a dual system, using the rear lamps for both turn and stop signals, wherein both rear lamps are steadily energized for a stop signal when no turn signal is being given, and wherein when one rear lamp is flashing for a turn signal, the other is energized steadily for a stop signal.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

A switch for use in a turn-indicating signalling system comprising a housing, means at one end of the housing for attaching it to the steering column of a vehicle, a lever pivoted at the other end of the housing with one end extending into the housing and its other end extending out of the housing, a pair of posts in the housing located toward its said one end and extending parallel to the pivot axis of the lever, a latch plate mounted for sliding movement on the posts, the lever having a detent at its end within the housing extending over and engageable by the latch plate, spring means biasing the latch plate into engagement with the detent, the latch plate being formed to latch the lever either in a right turn position on one side of a neutral position or a left turn position on the other side of neutral position, the latch plate being carried by a magnetic plunger slidable in a solenoid coil mounted in the housing, said coil, when energized, retracting the plunger and the latch plate against the bias of said spring means, a switch unit in the housing having right and left turn contacts and an operating member actuated by the lever for closing the right turn contacts when the lever is swung to right turn position and for closing the left turn contacts when the lever is swung to left turn position, and spring means in the switch unit biasing the switch operating member and the lever to neutral position.

HENRY G. DIBELKA.

References Cited in the file of this patent

UNITED STATES PATENTS

| Number | Name | Date |
|---|---|---|
| 1,465,596 | Collins et al. | Aug. 21, 1923 |
| 1,620,456 | Gallus et al. | Mar. 18, 1927 |
| 1,647,663 | Pollock | Nov. 1, 1927 |
| 1,690,370 | Moeller | Mar. 6, 1928 |
| 1,902,700 | Hadano | Mar. 21, 1933 |
| 2,111,931 | Howard | Mar. 22, 1938 |
| 2,122,508 | Bell | July 5, 1938 |
| 2,126,940 | Metcalf | Aug. 16, 1938 |
| 2,188,058 | Metcalf | Jan. 28, 1940 |
| 2,344,685 | Eshbaugh | Mar. 21, 1944 |
| 2,362,689 | Eshbaugh | Nov. 14, 1944 |
| 2,526,611 | Rodrick | Oct. 17, 1950 |
| 2,528,035 | Clayton | Oct. 31, 1950 |
| 2,596,834 | Barcus | May 13, 1952 |

FOREIGN PATENTS

| Number | Country | Date |
|---|---|---|
| 448,844 | Germany | Aug. 30, 1927 |